United States Patent
Jung et al.

(10) Patent No.: US 7,933,090 B1
(45) Date of Patent: Apr. 26, 2011

(54) DISK DRIVE ESTABLISHING WRITE CURRENT LIMITS PRIOR TO OPTIMIZING THE WRITE CURRENT FOR A PLURALITY OF TRACKS

(75) Inventors: Kameron Kam-Wai Jung, Yorba Linda, CA (US); Stephany W. Kwan, Rowland Heights, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 198 days.

(21) Appl. No.: 12/353,707

(22) Filed: Jan. 14, 2009

(51) Int. Cl.
*G11B 5/02* (2006.01)
(52) U.S. Cl. .......................................................... 360/68
(58) Field of Classification Search .................... 360/68, 360/31, 46, 66, 67, 75, 55; 326/30; 365/154
See application file for complete search history.

(56) References Cited

U.S. PATENT DOCUMENTS

| | | | | |
|---|---|---|---|---|
| 6,297,921 B1 * | 10/2001 | Price et al. | ....................... | 360/68 |
| 6,914,738 B2 * | 7/2005 | Fujiwara et al. | ................ | 360/68 |
| 6,972,920 B2 * | 12/2005 | Kim et al. | ......................... | 360/75 |
| 7,023,641 B2 * | 4/2006 | Doi et al. | ......................... | 360/68 |
| 7,242,544 B2 * | 7/2007 | Price et al. | ....................... | 360/46 |
| 7,372,649 B2 * | 5/2008 | VanEaton et al. | ................ | 360/46 |
| 7,660,064 B2 * | 2/2010 | Howley et al. | ................... | 360/68 |
| 7,786,754 B2 * | 8/2010 | Contreras et al. | ................ | 326/30 |
| 2004/0184177 A1 * | 9/2004 | Doi et al. | ......................... | 360/68 |
| 2004/0196582 A1 * | 10/2004 | VanEaton et al. | ............... | 360/46 |
| 2005/0007686 A1 * | 1/2005 | Bloodworth et al. | ........... | 360/67 |
| 2005/0174673 A1 * | 8/2005 | Price et al. | ....................... | 360/55 |
| 2005/0237785 A1 * | 10/2005 | Venca et al. | .................... | 365/154 |
| 2005/0254159 A1 * | 11/2005 | Venca et al. | .................... | 360/68 |
| 2007/0211365 A1 | 9/2007 | Yamazaki | | |
| 2008/0151406 A1 | 6/2008 | Takahashi | | |
| 2008/0204914 A1 * | 8/2008 | Hashizume | ..................... | 360/46 |
| 2009/0009903 A1 * | 1/2009 | Lee et al. | ......................... | 360/75 |

* cited by examiner

*Primary Examiner* — Fred Tzeng

(57) ABSTRACT

A disk drive is disclosed comprising control circuitry operable to calibrate a write current parameter. A write current is initialized to an initial write current INIT_Iw, and an overshoot is initialized to a maximum MAX_OS. The write current is swept from INIT_Iw to a maximum write current MAX_Iw while writing and reading data from a target track to measure a first quality metric. A second quality metric associated with wide track erasure is also measured. A quality of the write operations is determined in response to the first and second quality metrics. When the quality of the write operations does not exceed a threshold, at least one of the MAX_Iw and MAX_OS is decreased and the process is repeated. Otherwise, the write current is swept from a minimum write current limit MAX_Iw to the adjusted MAX_Iw for a plurality of tracks to find an optimal write current for each track.

16 Claims, 5 Drawing Sheets

DISK DRIVE ESTABLISHING WRITE CURRENT LIMITS PRIOR TO OPTIMIZING THE WRITE CURRENT FOR A PLURALITY OF TRACKS

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Data is typically written to the disk by modulating a write current in an inductive coil to record magnetic transitions onto the disk surface. During readback, the magnetic transitions are sensed by a read element (e.g., a magnetoresistive element) and the resulting read signal demodulated by a suitable read channel. It is desirable to optimize one or more write parameters (e.g., write current amplitude and overshoot) in order to maximize reliability during readback.

SUMMARY OF EMBODIMENT OF THE INVENTION

A disk drive is disclosed comprising control circuitry operable to calibrate a write current parameter. A write current is initialized to an initial write current INIT_Iw, and an overshoot is initialized to a maximum MAX_OS. The write current is swept from INIT_Iw to a maximum write current MAX_Iw while writing and reading data from a target track to measure a first quality metric. A second quality metric associated with wide track erasure is also measured. A quality of the write operations is determined in response to the first and second quality metrics. When the quality of the write operations does not exceed a threshold, at least one of the MAX_Iw and MAX_OS is decreased and the process is repeated. Otherwise, the write current is swept from a minimum write current limit MIN_Iw to the adjusted MAX_Iw for a plurality of tracks to find an optimal write current for each track.

DETAILED DESCRIPTION OF EMBODIMENTS OF THE INVENTION

Figure 1:
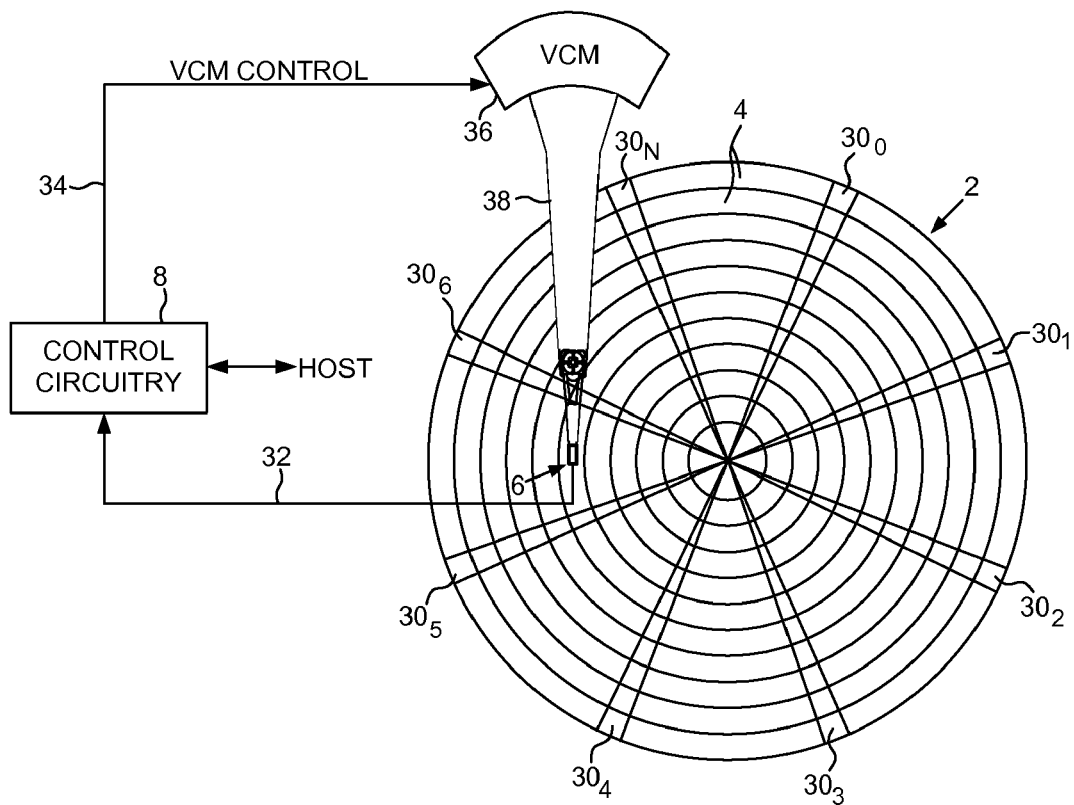
FIG. 1 shows a disk drive according to an embodiment of the present invention comprising a disk having a plurality of tracks, a head actuated over the disk, and control circuitry.

FIG. 1 shows a disk drive according to an embodiment of the present invention comprising a disk 2 having a plurality of tracks 4, and a head 6 actuated over the disk 2. The disk drive further comprises control circuitry 8 operable to calibrate a write current parameter by executing the flow diagram shown in FIG. 2. A maximum write current limit (MAX_Iw) and a maximum overshoot limit (MAX_OS) are set (step 10). A write current is initialized to an initial write current (INIT_Iw) less than MAX_Iw, and an overshoot is initialized to MAX_OS (step 12). Data is written to a target track (step 14), and then read from the target track in order to measure a quality metric associated with the write current (step 16). If the write current has not reached MAX_Iw (step 18), the write current is increased (step 20) and the process repeated. After sweeping the write current from INIT_Iw to MAX_Iw, a quality metric associated with wide track erasure is measured (step 22). A quality of the write operations is determined in response to the quality metrics associated with the write current and the wide track erasure, and if the quality of the write operations does not exceed a threshold (step 24), at least one of the MAX_Iw and MAX_OS is decreased (step 26) and the process is repeated. When the quality of the write operations exceeds the threshold (step 24), the write current is swept from a minimum write current limit (MAX_Iw) to the adjusted MAX_Iw for a plurality of tracks to find an optimal write current for each track (step 28).

Figure 2:
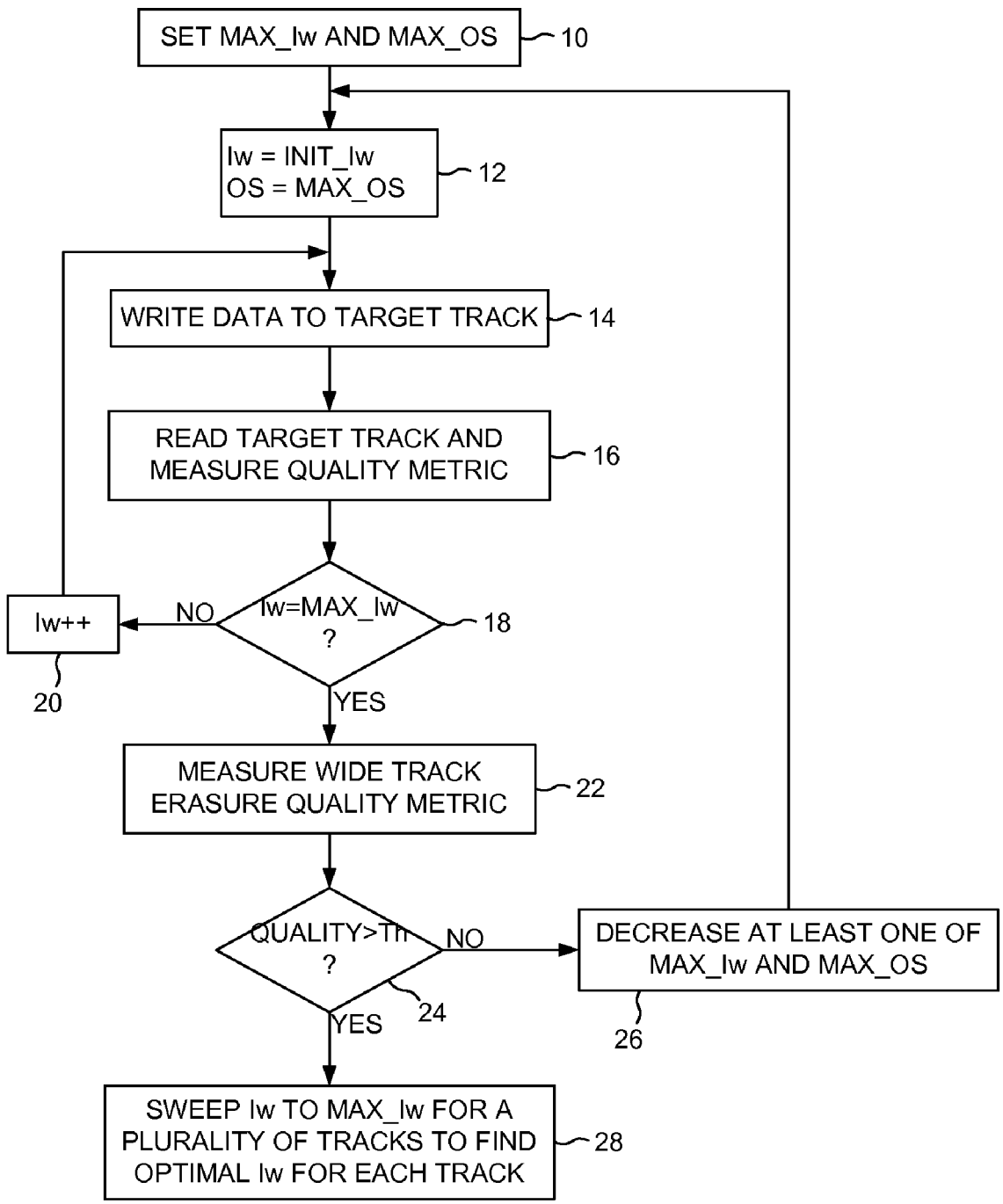
FIG. 2 is a flow diagram executed by the control circuitry to calibrate at least one of a write current and overshoot parameters according to an embodiment of the present invention.

In one embodiment, only one of the MAX_Iw or the MAX_OS is decreased at step 26 of FIG. 2, and in another embodiment, both MAX_IW and MAX_OS are decreased together at step 26. In yet another embodiment, the MAX_Iw and the MAX_OS may be decreased separately at step 26, for example, by decreasing MAX_Iw, and then decreasing MAX_OS, and then decreasing MAX_Iw, and so on.

In the embodiment of FIG. 1, the disk 2 comprises a plurality of embedded servo sectors $30_0$-$30_N$ which define the plurality of tracks 4. Each servo sector $30_1$ comprises head positioning information such as a track address for coarse positioning during seeks, and servo bursts for fine positioning while tracking the centerline of a target track during write/read operations. The control circuitry 8 processes a read signal 32 emanating from the head 6 to demodulate the servo sectors into a position error signal (PES). The PES is filtered with a suitable compensation filter to generate a control signal 34 applied to a VCM 36 which rotates an actuator arm 38 about a pivot in a direction that reduces the PES.

When writing data to the disk, certain phenomena may detrimentally affect the quality of the write operation, as well as corrupt data just written in the same track, as well as data written in adjacent tracks and near adjacent tracks. For example, the amplitude of the write current (including the overshoot setting) determines the degree the magnetic media is saturated, and therefore affects the quality of the read signal during read operations. However, an excessive write current may cause reverse-field partial erasure (RFPE) of the data just previously written in the same track. In addition, an excessive write current may cause adjacent track erasure (ATE) of data written in the immediately adjacent tracks, as well as wide area track erasure (WATER) of data written several tracks away from the target track. These phenomena may vary depending on the type of media and heads deployed generally for a family of disk drives, as well as the type of recording technology (e.g., longitudinal recording or perpendicular recording). These phenomena may also vary from drive to drive within a family of disk drives. Therefore, it is desirable to calibrate an optimal write current setting (including overshoot setting) in order to achieve acceptable read signal quality without corrupting previously written data.

In the flow diagram described above with reference to FIG. 2, a limit on the maximum write current and/or overshoot settings is determined by measuring the effect of the write current on a target track, as well as the effect of the maximum write current with respect to WATER. The overshoot setting is set to a maximum (MAX_OS), and the write current is swept from an initial value to a maximum value (MAX_Iw) while writing data to a target track (e.g., pseudo random data that simulates a typical write operation). For each setting, a quality metric is measured associated with the target track. At this point, the maximum write current and overshoot may be acceptable for the target track (generate a suitable quality metric); however, the maximum write current MAX_Iw may cause an unacceptable level of WATER. Therefore, a quality metric associated with WATER is measured for the current MAX_Iw. All of the quality metrics are then evaluated to determine whether the quality of the write operation is acceptable. If not, the maximum write current MAX_Iw and/or the maximum overshoot MAX_OS are decreased and the process is repeated. Once an acceptable limit on the maximum write current and overshoot settings is determined, the optimal write current for a number of other tracks is determined using the limits. The optimal write current can be determined for the other tracks without concern for the affect of the maximum write current on WATER since the previously determined limits ensures that the maximum write current has acceptable WATER performance.

In one embodiment, the flow diagram of FIG. 2 is executed for a subset of disk drives in a family of disk drives, and then nominal limits for the write current and overshoot parameters are selected for use in every production disk drive. In an alternative embodiment, each production disk drive executes the flow diagram of FIG. 2 to select (or tune) the limits based on the particular characteristics of each disk drive.

In one embodiment, the tracks 4 shown in FIG. 1 are banded together to form a plurality of zones, and the limits for the write current and overshoot parameters are determined for each zone. The optimal write current may then be determined by executing step 28 of FIG. 2 for one or more tracks within each zone. In one embodiment, both the write current and the overshoot parameters may be optimized for each zone, and in one embodiment, the overshoot parameter may be optimized for a single track within the zone, whereas the write current may be optimized for multiple tracks within a zone (e.g., every track or every other track).

Figure 3:
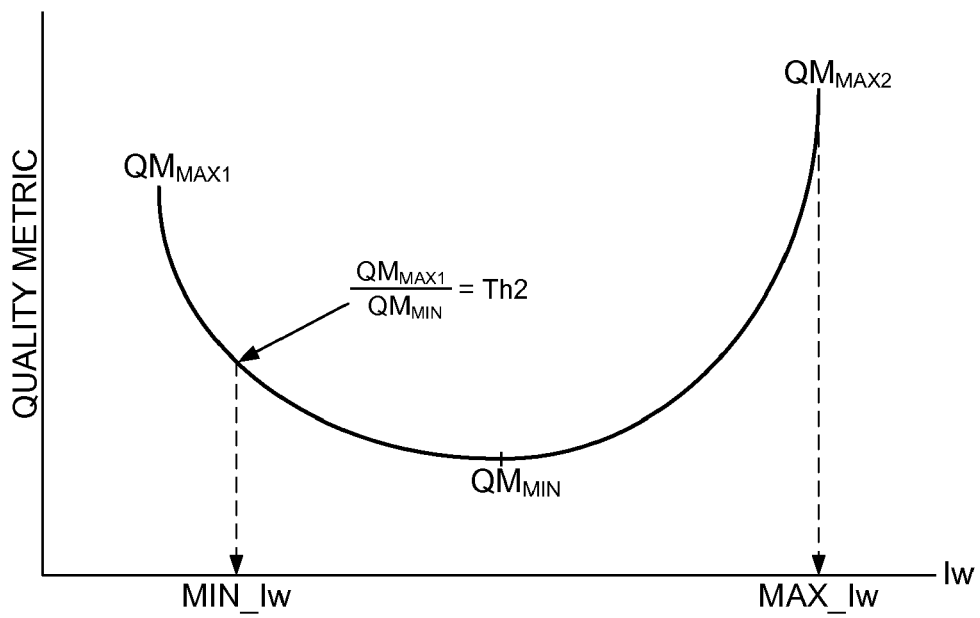
FIG. 3 illustrates an embodiment of the present invention wherein a minimum write current and a maximum write current are selected relative to a quality metric measured after writing data to a target track.

Any suitable quality metric may be employed in the embodiments of the present invention, such as a mean squared error between expected and actual read signal samples, or a detector margin within a sequence detector (e.g., a Viterbi margin). FIG. 3 shows an example relationship between the write current and corresponding quality metrics that may be measured at step 16 and step 22 of FIG. 2, wherein the smaller the quality metric the better the write quality. FIG. 3 illustrates that the quality metric curve is a bathtub curve having a first maximum (QMmax1) at the low write current setting (due to low saturation), and a second maximum (QMmax2) at the high write current setting (due to RFPE, ATI, WATER, etc.). The bathtub curve also has a minimum (QMmin) at a medium write current setting.

Figure 4:
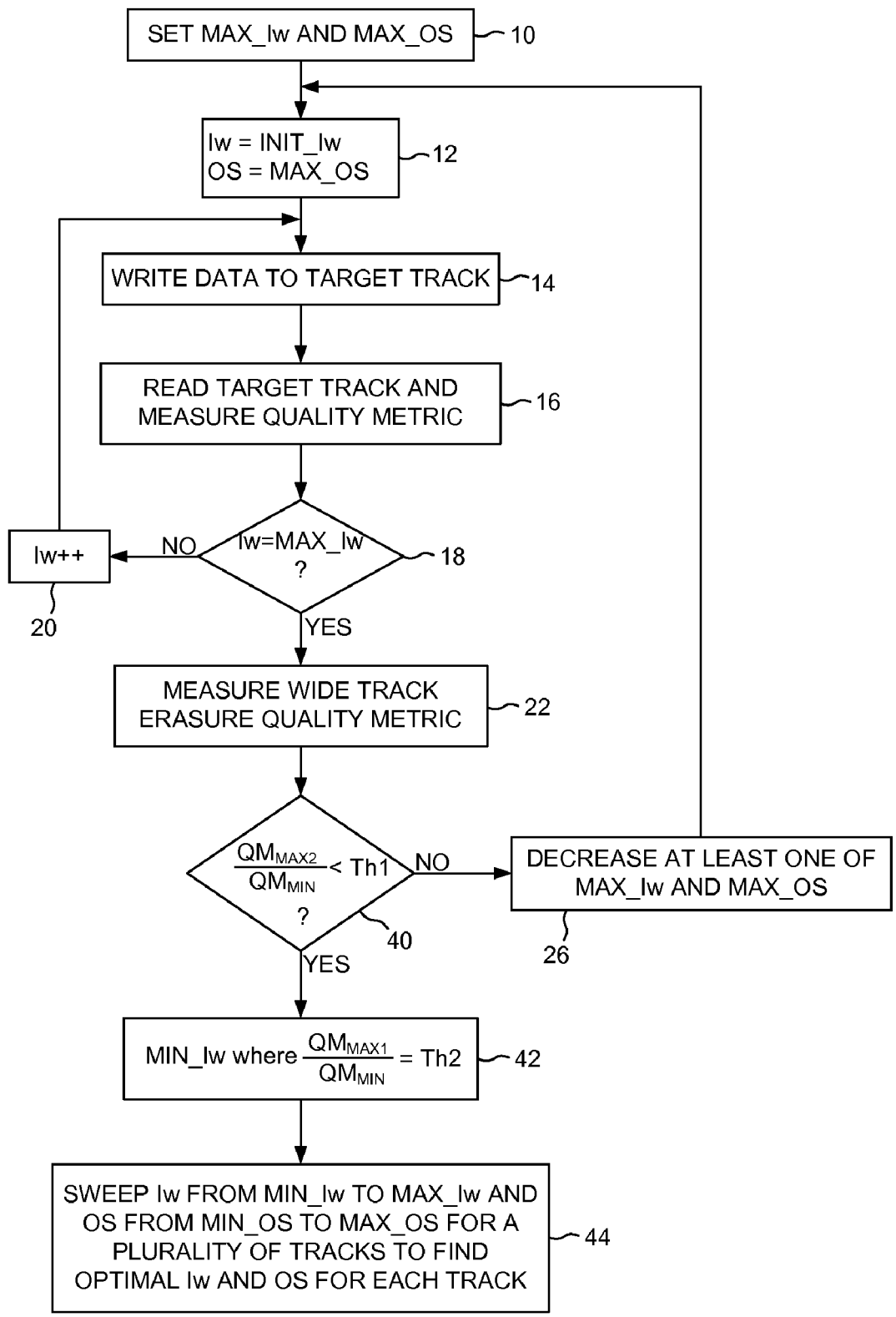
FIG. 4 is a flow diagram according to an embodiment of the present invention wherein a ratio of the maximum to minimum quality metrics is used to calibrate at least one of the write current and overshoot parameters.

FIG. 4 is a flow diagram which extends on the flow diagram of FIG. 2 according to an embodiment of the present invention. In FIG. 4, whether the quality of the write operation exceeds a threshold (step 24 of FIG. 2) depends on whether a ratio of the second maximum to the minimum quality metric ($QM_{max2}/QM_{min}$) exceeds a threshold Th1 (step 40 of FIG. 4). If the ratio exceeds the threshold Th1 (step 40), then the quality of the write operation is deemed unacceptable, and therefore at least one of the maximum write current MAX_Iw and the maximum overshoot MAX_OS is decreased (step 26) and the process is repeated. If the ratio does not exceed the threshold Th1 (step 40), then a minimum limit for the write current is determined as the write current where the ratio of the first maximum to minimum quality metric ($QM_{max1}/QM_{min}$) equals a threshold Th2 (step 42). Referring to the example curve of FIG. 3, the minimum limit for the write current MAX_Iw is selected as shown where $QM_{max1}/QM_{min}$=Th2.

The thresholds Th1 and Th2 in the flow diagram of FIG. 2 may be selected in any suitable manner. In one embodiment, the thresholds may be selected so as to achieve a desired bit error rate performance. The bit error rate analysis may be carried out for a subset of disk drives to find nominal thresholds, and the nominal threshold then employed in a family of disk drives. Alternatively, the thresholds may be optimized or tuned for each production disk drive by performing a bit error rate calibration during a manufacturing procedure.

After determining the minimum limit for the write current MAX_Iw, the write current parameters are calibrated for a plurality of tracks (step 44) by sweeping the write current Iw from the minimum limit MAX_Iw to the maximum limit MAX_Iw, and by sweeping the overshoot from a minimum limit MIN_OS to the maximum limit MAX_OS. In one embodiment, the optimal overshoot setting is determined once for a target track in each zone, and the write current setting is determined for a plurality tracks within each zone (e.g., every track or every other track within a zone).

Figure 5A:
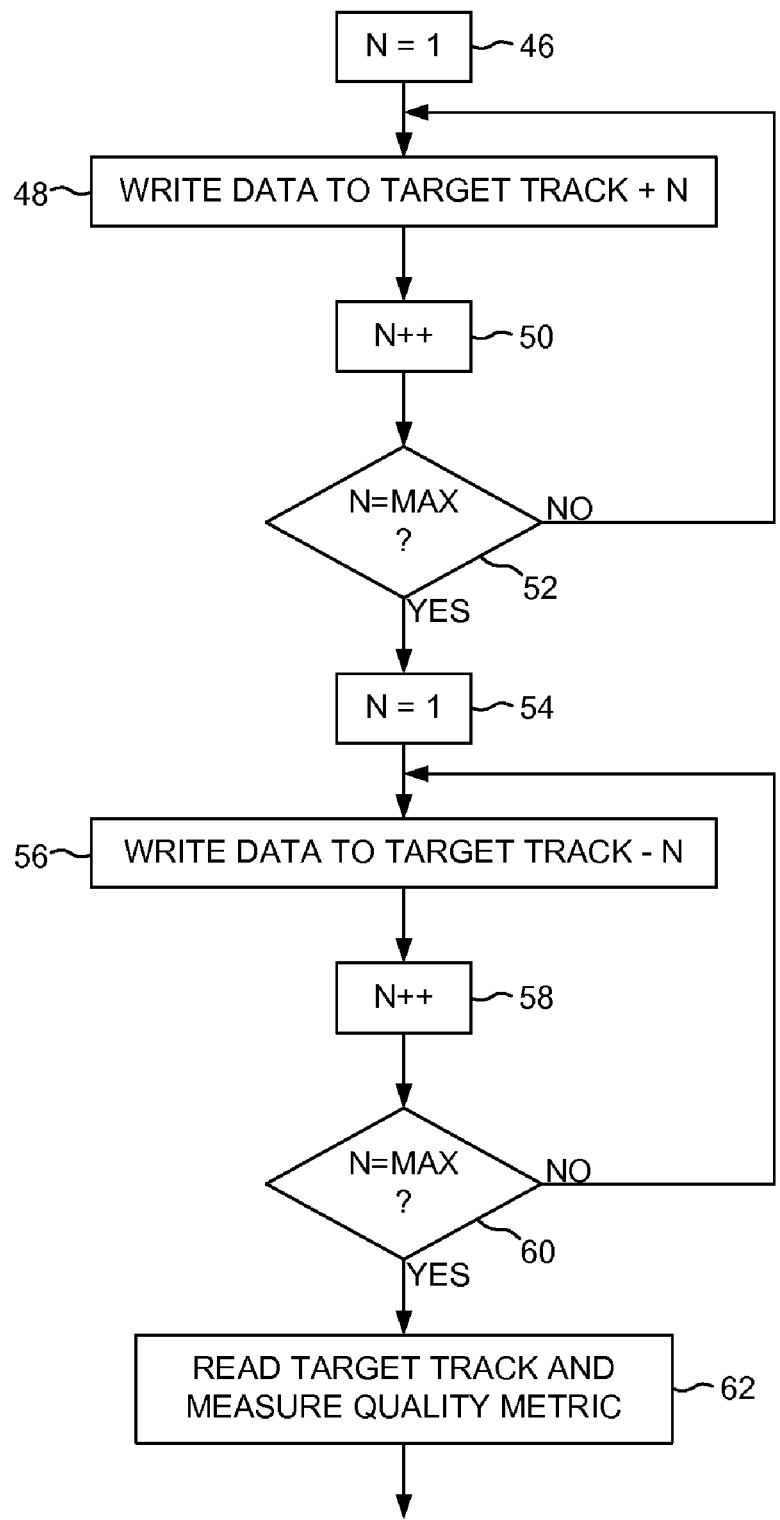
FIG. 5A is a flow diagram for measuring a quality metric associated with wide track erasure according to an embodiment of the present invention.

Any suitable technique may be employed to measure the WATER quality metric (step 22). FIG. 5A is a flow diagram for measuring the WATER quality metric according to an embodiment wherein data is written to a number of tracks on both sides of the target track. A counter N is initialized to one (step 46), data is written to a target track+N (step 48), the counter N is incremented (step 50), and the process is repeated for a number of tracks (step 52). The counter is reset (step 54), data is written to a target track−N (step 56), the counter N is incremented (step 58), and the process repeated for a number of tracks (step 60). In one embodiment, data is written to each track a number of times to simulate multiple write operations. The target track is then read and a corresponding quality metric generated (step 62) which represents the affect of WATER on the target track.

Figure 5B:
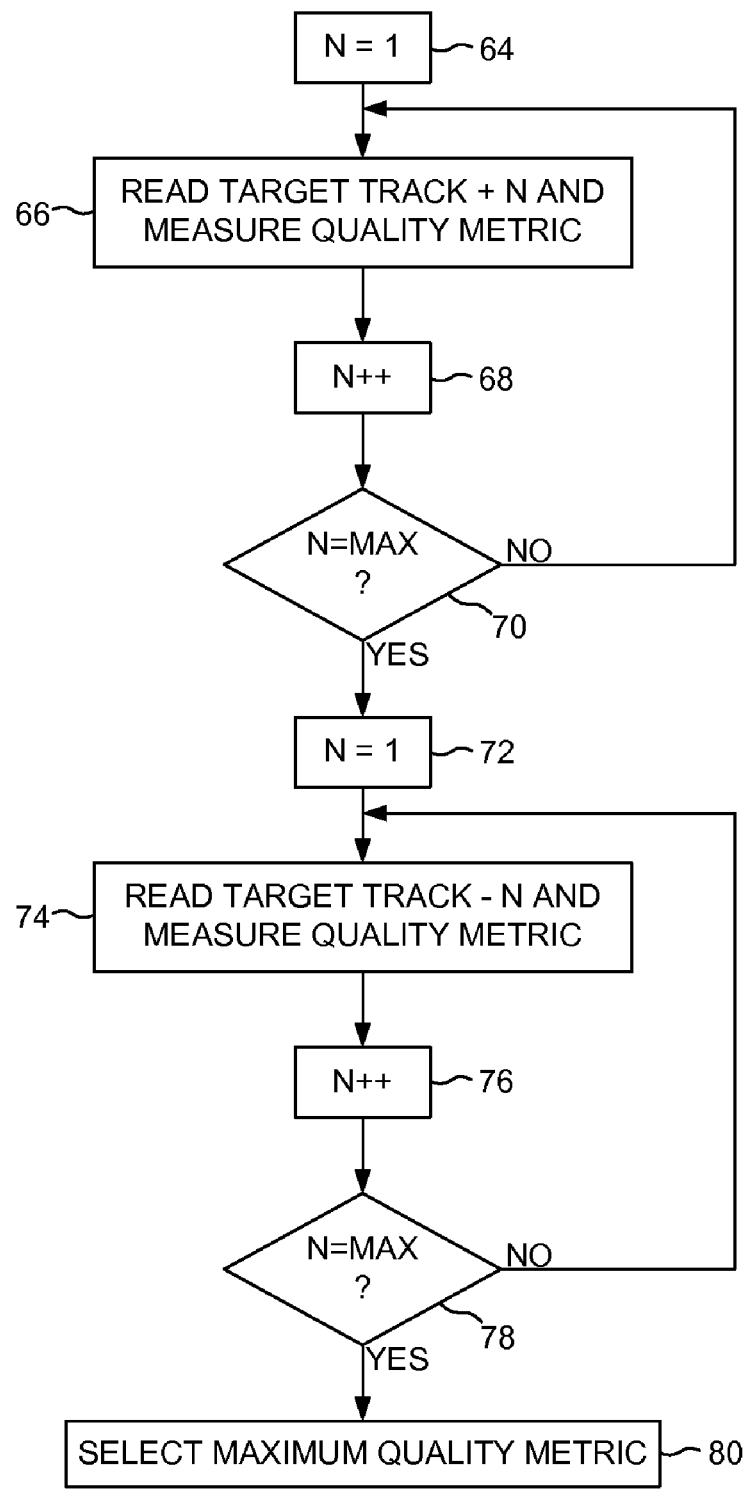
FIG. 5B is a flow diagram for measuring a quality metric associated with wide track erasure according to an alternative embodiment of the present invention.

FIG. 5B is a flow diagram for measuring the WATER quality metric according to an alternative embodiment wherein after writing data to the target track, data from a number of tracks on both sides of the target track are read. A counter N is initialized to one (step 64), data is read from a target track+N (step 66), the counter N is incremented (step 68), and the process is repeated for a number of tracks (step 70). The counter is reset (step 72), data is read from a target track−N (step 74), the counter N is incremented (step 76), and the process repeated for a number of tracks (step 78). The maximum (worst) quality metric measured for all of the adjacent tracks is then selected as the WATER quality metric (step 80). In one embodiment, the data written to the target track is the data written when measuring the write current quality metrics (step 16 of FIG. 2). In another embodiment, additional write operations are performed on the target track prior to measuring the WATER quality metric. Prior to writing the data to the target track, the adjacent tracks may be initialized with any suitable data, such as DC erased or written with a known pattern. In one embodiment, the adjacent tracks are read prior to measuring the WATER quality metric in order to establish a baseline quality metric before writing data to the target track. The final quality metric for each adjacent track is then measured relative to the baseline in order to measure the affect of WATER on the adjacent tracks.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks;
   a head actuated over the disk; and
   control circuitry operable to:
   (a) set a maximum write current limit (MAX_Iw) and an maximum overshoot limit (MAX_OS);
   (b) initialize a write current to an initial write current (INIT_Iw) less than MAX_Iw, and initialize an overshoot to MAX_OS;
   (c) first sweep the write current from INIT_Iw to MAX_Iw, wherein for each write current:
       write data to a target track; and
       read the target track and measure a first quality metric;
   (d) measure a second quality metric associated with wide track erasure;
   (e) determine a quality of the write operations in response to the first and second quality metrics;
   (f) when the quality of the write operations does not exceed a threshold, decrease at least one of MAX_Iw and MAX_OS and re-execute steps (b)-(e); and
   (g) when the quality of the write operations exceeds the threshold, second sweep the write current from a minimum write current limit (MAX_Iw) to the adjusted MAX_Iw for a plurality of tracks to find an optimal write current for each track.

2. The disk drive as recited in claim 1, wherein the data written to the target comprises pseudo random data.

3. The disk drive as recited in claim 1, wherein the overshoot comprises an overshoot amplitude and an overshoot duration.

4. The disk drive as recited in claim 1, wherein step (g) further comprises sweeping the overshoot from a minimum setting to the adjusted MAX_OS for the plurality of tracks to find an optimal overshoot for each track.

5. The disk drive as recited in claim 1, wherein the control circuitry measures the quality of the write operation relative to a ratio between a maximum quality metric corresponding to MAX_Iw and a minimum quality metric generated over the first sweep.

6. The disk drive as recited in claim 1, wherein the control circuitry selects MAX_Iw in step (g) relative to a ratio between a maximum quality metric corresponding to INIT_Iw and a minimum quality metric generated over the first sweep.

7. The disk drive as recited in claim 1, wherein the control circuitry is further operable to measure a second quality metric associated with wide track erasure in step (d) by:
   writing data to at least five tracks on both sides of the target track; and
   reading data from the target track and measure the second quality metric.

8. The disk drive as recited in claim 1, wherein the control circuitry is further operable to measure a second quality metric associated with wide track erasure in step (d) by:
   reading data from at least five tracks on both sides of the target track;
   measuring a second quality metric for each of the tracks; and
   selecting one of the second quality metrics.

9. A method of operating a disk drive, the disk drive comprising a disk comprising a plurality of tracks, and a head actuated over the disk, the method comprising:
   (a) setting a maximum write current limit (MAX_Iw) and an maximum overshoot limit (MAX_OS);
   (b) initializing a write current to an initial write current (INIT_Iw) less than MAX_Iw, and initialize an overshoot to MAX_OS;
   (c) first sweeping the write current from INIT_Iw to MAX_Iw, wherein for each write current:
       write data to a target track; and
       read the target track and measure a first quality metric;
   (d) measuring a second quality metric associated with wide track erasure;
   (e) determining a quality of the write operations in response to the first and second quality metrics;
   (f) when the quality of the write operations does not exceed a threshold, decreasing at least one of MAX_Iw and MAX_OS and re-executing steps (b)-(e); and
   (g) when the quality of the write operations exceeds the threshold, second sweeping the write current from a minimum write current limit (MAX_Iw) to the adjusted MAX_Iw for a plurality of tracks to find an optimal write current for each track.

10. The method as recited in claim 9, wherein the data written to the target comprises pseudo random data.

11. The method as recited in claim 9, wherein the overshoot comprises an overshoot amplitude and an overshoot duration.

12. The method as recited in claim 9, wherein step (g) further comprises sweeping the overshoot from a minimum setting to the adjusted MAX_OS for the plurality of tracks to find an optimal overshoot for each track.

13. The method as recited in claim 9, further comprising measuring the quality of the write operation relative to a ratio between a maximum quality metric corresponding to MAX_Iw and a minimum quality metric generated over the first sweep.

14. The method as recited in claim 9, further comprising selecting the MAX_Iw in step (g) relative to a ratio between a maximum quality metric corresponding to INIT_Iw and a minimum quality metric generated over the first sweep.

15. The method as recited in claim 9, further comprising measuring a second quality metric associated with wide track erasure in step (d) by:
  writing data to at least five tracks on both sides of the target track; and
  reading data from the target track and measure the second quality metric.

16. The method as recited in claim 9, further comprising measuring a second quality metric associated with wide track erasure in step (d) by:
  reading data from at least five tracks on both sides of the target track;
  measuring a second quality metric for each of the tracks; and
  selecting one of the second quality metrics.

* * * * *